(12) United States Patent  
Goulart (10) Patent No.: US 8,812,376 B2  
(45) Date of Patent: Aug. 19, 2014

(54) TECHNIQUES FOR GENERATING AN ELECTRONIC SHOPPING LIST

(71) Applicant: Valerie Goulart, Seattle, WA (US)

(72) Inventor: Valerie Goulart, Seattle, WA (US)

(73) Assignee: Wal-Mart Stores, Inc., Bentonville, AR (US)

(*) Notice: Subject to any disclaimer, the term of this patent is extended or adjusted under 35 U.S.C. 154(b) by 0 days.

(21) Appl. No.: 13/631,643

(22) Filed: Sep. 28, 2012

(65) Prior Publication Data

US 2014/0095348 A1 Apr. 3, 2014

(51) Int. Cl.
*G06Q 30/00* (2012.01)

(52) U.S. Cl.
USPC .................. 705/26.8; 705/26.1; 705/27.1

(58) Field of Classification Search
USPC ................................. 705/26.1–27.2
See application file for complete search history.

(56) References Cited

U.S. PATENT DOCUMENTS

| | | | |
|---|---|---|---|
| 7,576,753 B2 * | 8/2009 | Saund et al. ................. | 345/619 |
| 2009/0083327 A1 * | 3/2009 | Ringham et al. ............ | 707/104.1 |
| 2010/0156919 A1 * | 6/2010 | Bala et al. .................... | 345/582 |
| 2011/0193788 A1 * | 8/2011 | King et al. .................... | 345/173 |

OTHER PUBLICATIONS

MacRumors, Dec. 4, 2011, 06:22 PM, Pocket Lists. The ultimate checklist & to-do app, http://forums.macrumors.com/showthread.php?t=1286734.*

Bradbury, D. (Nov. 12, 2008). Touch screens transform the smartphone experience. CanWest News. Retrieved from http://search.proquest.com/docview/461158822?accountid=14753.*

The future of computing is flat. (Mar. 14, 2002). The Saigon Times Magazine, , 1. Retrieved from http://search.proquest.com/docview/228621440?accountid=14753.*

* cited by examiner

*Primary Examiner* — Resha Desai  
*Assistant Examiner* — Alex Wolcott  
(74) *Attorney, Agent, or Firm* — David R. Stevens; Stevens Law Group (57) ABSTRACT

Techniques are disclosed for generating an electronic shopping list based on a digital photograph of a handwritten shopping list. The techniques include obtaining a digital photograph of a handwritten shopping list and identifying a handwritten text portion in the digital photograph. The techniques further include determining a set of candidate items corresponding to the handwritten text portion, each candidate item of the set of candidate items representing a different item that may have written in the handwritten text portion of the handwritten shopping list and being indicative of a product sold by a retailer. The techniques further include selecting one of the set of candidate items for inclusion in the electronic shopping list. The techniques can be performed by a mobile computing device or by a shopping list server.

16 Claims, 9 Drawing Sheets

TECHNIQUES FOR GENERATING AN ELECTRONIC SHOPPING LIST

RELATED U.S. APPLICATION

This application is related to U.S. application Ser. No. 13/631,623, filed Sep. 28, 2012. The application is incorporated herein by reference for all purposes.

BACKGROUND INFORMATION

1. Field of the Disclosure

The present invention relates generally to systems and methods for generating an electronic shopping list. In particular, examples of the present invention are related to techniques for generating an electronic shopping list based on a digital photograph of a handwritten shopping list.

2. Background

Many consumers shop for products such as groceries, office supplies, and household wares using handwritten shopping lists A consumer will write a shopping list on a piece of paper and take the handwritten shopping list to the store. In some instances handwritten lists may be much easier than manually entering each item into an electronic device such as a mobile phone. However, handwritten shopping lists can also be lost or destroyed before the consumer arrives at the store. Furthermore, handwritten lists cannot be easily shared with or modified by others who are not in the same location. In addition, it may be difficult to read your own handwriting, let alone the writing from another person who may have written the list. Consumers may also have to rewrite lists every week, even though they may usually buy the same items.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The flowchart and block diagrams in the flow diagrams illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

As described above, consumers handwrite their shopping lists when preparing to shop for products. As used herein, the term "product" can refer to groceries, foods, office supplies, clothing wares, general merchandise, or any other fungible goods sold by a retailer. Techniques are disclosed herein that allow a user of a mobile computing device to create a shopping list using a computing device by taking a digital photograph of the handwritten shopping list. The mobile computing device uses the digital photograph to create an electronic shopping list. The electronic shopping list can be stored by the computing device and later accessed while the user is shopping. As used herein, the term "mobile computing device" can refer to any type of mobile computing devices, such as mobile telephones, laptop computers, and tablet computers, or stationary computing devices. Users of mobile computing devices can store the shopping list on the mobile computing device and access the shopping list while shopping.

In accordance with various embodiments of the present disclosure, techniques are described for generating an electronic shopping list based on a digital photograph of an electronic shopping list. In these embodiments, a set of candidate items are determined for a handwritten text portion of the electronic shopping list, and one of the candidate items is selected for inclusion in the electronic shopping list. As used herein, the term "item" can refer to any type of indicator of a product sold by a retailer. An item can refer to a generic product or a specific product. A generic product is a type of product, e.g., eggs, milk, and bread. A specific product is a brand of product, e.g., PEPSI®, TUMS®, POP TARTS®. Furthermore, a specific product can also include a unitary amount, e.g., a 16ct box of POP TARTS®.

Furthermore, techniques are described for generating an electronic shopping list based on a digital photograph by generating an overlay for the digital photograph. The overlay provides a graphical user interface having one or more input objects that allow a user of the mobile computing device to mark the digital photograph at specific locations on the electronic shopping list.

Figure 1A:
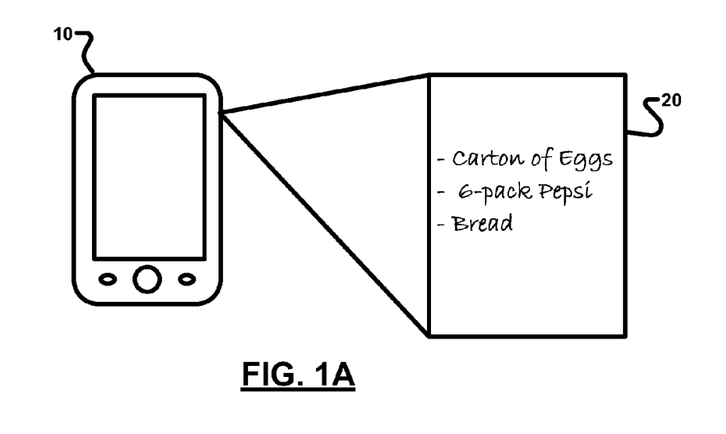
FIG. 1A is a schematic of a mobile computing device configured to generate an electronic shopping list based on a digital photograph of a handwritten shopping list according to some embodiments of the present disclosure.

Referring now to FIG. 1A, a mobile computing device 10 is depicted. According to some embodiments, the mobile computing device 10 is configured to capture a digital photograph of a handwritten shopping list 20 and to generate an electronic shopping list based on the handwritten shopping list 20. As used herein, the term "electronic shopping list" may refer to a list of items electronically displayed in a graphical user interface (GUI) displayed by the mobile computing device 10. Alternatively, in some embodiments, the term "electronic shopping list" may refer to a digital photograph of the handwritten shopping list with an overlay overlaid on the digital photograph which provides an interface to mark the digital photograph at specific locations on the handwritten shopping list.

Figure 1B:
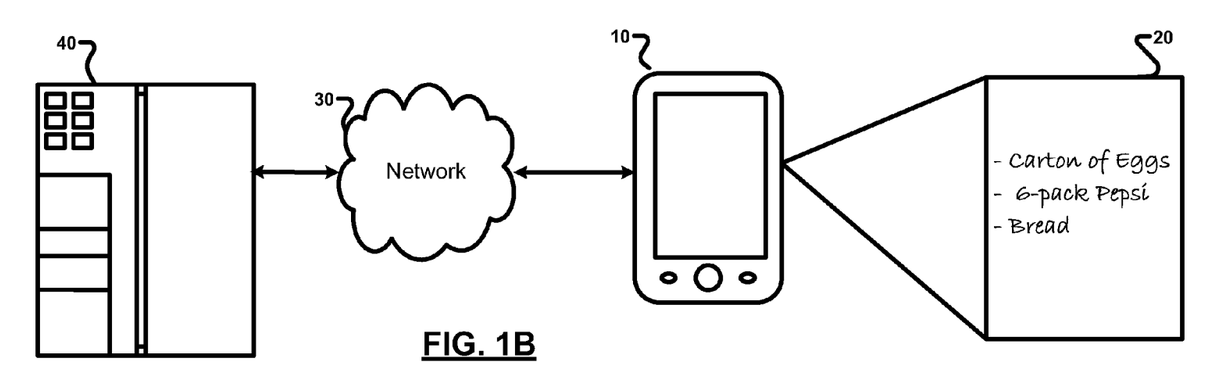
FIG. 1B is a schematic illustrating a mobile computing device in communication with a shopping list server configured to generate an electronic shopping list based on a digital photograph of a handwritten shopping list according to some embodiments of the present disclosure.

Referring now to FIG. 1B, a mobile computing device 10 in communication with a shopping list server 40 via a network is depicted. In some embodiments, the mobile computing device 10 is configured to capture the digital photograph of handwritten shopping list 20 and to provide the digital photograph to the shopping list server 40. In these embodiments, the shopping list server 40 is configured to generate the electronic shopping list based on the digital photograph and to provide the electronic shopping list, or components thereof, to the mobile computing device 10.

Figure 2:
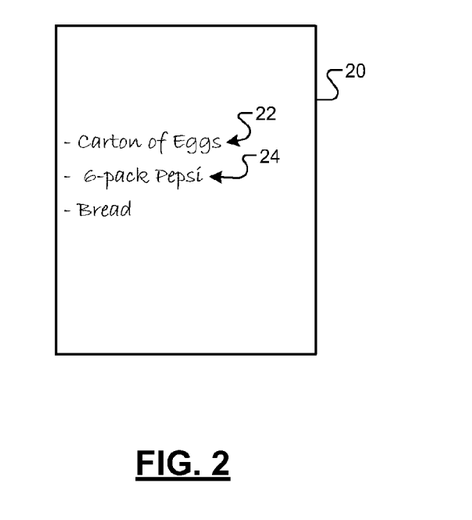
FIG. 2 is a drawing illustrating a handwritten shopping list.

Referring now to FIG. 2, an example of a handwritten shopping list 20 is depicted. In the illustrated example, the handwritten shopping 20 includes has a first handwritten text portion 22 and a second handwritten text portion 24. The first handwritten text portion 22 is a handwritten item indicating 1 carton of eggs. The second handwritten text portion 24 is a handwritten item indicating a 6-pack of PEPSI®. It should be appreciated that the handwritten shopping list 20 is provided for example only and not intended to be limiting.

Figure 3:
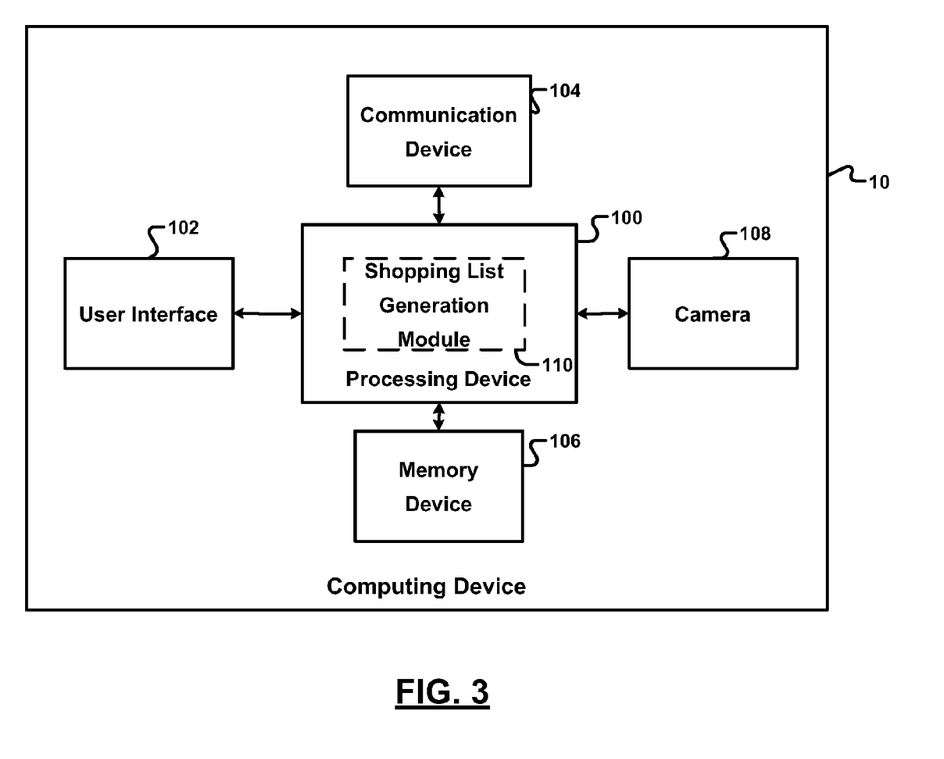
FIG. 3 is a schematic illustrating exemplary components of the computing device of FIGS. 1A and 1B.

Referring now to FIG. 3, a schematic illustrating example components of the mobile computing device 10 of FIGS. 1A and 1B is illustrated. In the example embodiment, the mobile computing device 10 includes a processing device 100, a user interface 102, a communication device 104, a memory device 106, and a camera 108.

The processing device 100 can include memory, e.g., read only memory (ROM) and random access memory (RAM), storing processor-executable instructions and one or more processors that execute the processor-executable instructions. In embodiments where the processing device 100 includes two or more processors, the processors can operate in a parallel or distributed manner. The processing device 100 can execute the operating system of the computing device. In the illustrative embodiment, the processing device 100 also executes a shopping list generation module 110, which is described in greater detail below.

The user interface 102 is a device that allows a user to interact with the mobile computing device 10. While one user interface 102 is shown, the term "user interface" can include, but is not limited to, a touch screen, a physical keyboard, a mouse, a microphone, and/or a speaker. The communication device 104 is a device that allows the mobile computing device 10 to communicate with another device, e.g., the shopping list server 40, via the network 30. The communication device 104 can include one or more wireless transceivers for performing wireless communication and/or one or more communication ports for performing wired communication. The memory device 106 is a device that stores data generated or received by the mobile computing device 10. The memory device 106 can include, but is not limited to, a hard disc drive, an optical disc drive, and/or a flash memory drive.

The camera 108 is a digital camera that captures a digital photograph. As used herein, the term "photograph" can refer to any type of digital photograph, still frame of a video, a scanned image, or an image captured and processed in real time by an image capture device that will not create an artifact. The camera 108 receives an instruction to capture an image, captures an image of an object, i.e., a handwritten shopping list, and outputs the digital photograph. The digital photograph can be a bitmap file. The bitmap file can be a bitmap, a JPEG, a GIF, or any other suitably formatted file. The camera 108 can receive the instruction to capture the image from the processing device 100 and can output the digital photograph to the processing device 100.

The shopping list generation module 110 obtains a digital photograph of a handwritten shopping list 20 and determines an electronic shopping list based on the digital photograph. The shopping list generation module 110 can obtain the digital photograph in any suitable manner. For instance, the shopping list generation module 110 can allow the user to utilize the photograph using the digital camera 108. Alternatively or additionally, the shopping list generation module 110 can allow the user to upload the digital photograph of the handwritten shopping list from an album, email, text message, or any other suitable source.

In some embodiments, the shopping list generation module 110 provides the digital photograph to the shopping list server 40 and receives an electronic shopping list from the shopping list server 40. The shopping list generation module 110 stores the electronic shopping list in the memory device 106 and displays the electronic shopping list, thereby allowing the user to access the electronic shopping list while shopping. In another example, memory device 106 may be located in a cloud and may be accessed by the user in the same manner. As mentioned above, in some embodiments, the shopping list generation module 110 is configured to generate the electronic shopping list instead of the shopping list server 40.

Figure 4:
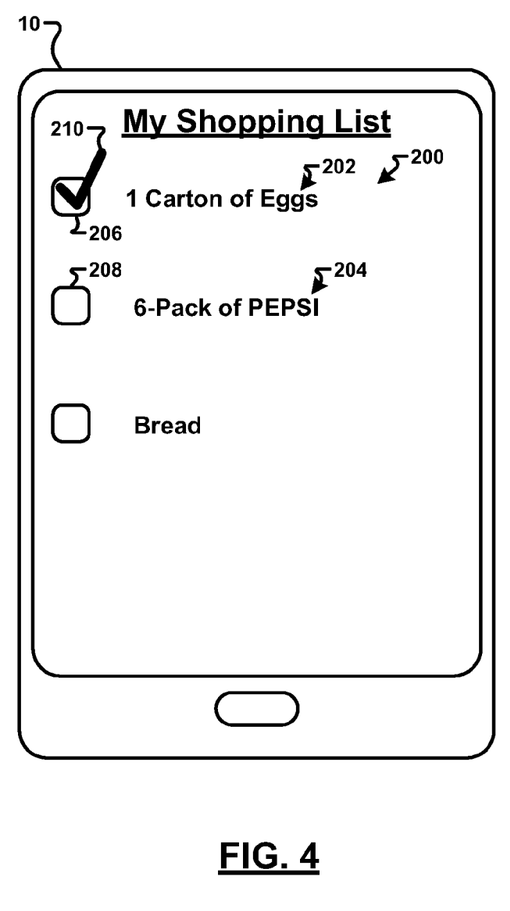
FIG. 4 is a drawing illustrating an example of a mobile computing device displaying an electronic shopping list according to some embodiments of the present disclosure.

Referring now to FIG. 4, an example of an electronic shopping list 200 being displayed by a mobile computing device 10 according to some embodiments of the present disclosure. In the illustrated embodiment, the electronic shopping list 200 is based on the handwritten shopping list of FIG. 2 and is comprised of a first item 202 and a second item 204 being displayed in an electronic text format. Displayed next to the first item 202 is a first input object 206, e.g., a first checkbox, and next to the second item is a second input object 208, e.g., a second checkbox. The user can mark an input object 206 or 208 when the user places the product indicated by the item in his or her shopping cart or basket. For example, in embodiments where the user interface 102 includes a touch screen, the user can touch the touch screen at the location of an input object 206 or 208 to mark the input object. In the illustrated example, the user has marked the first input object 206 (indicated by checkmark 210), presumably indicating that the user has obtained a carton of eggs off the shelf.

Figure 5:
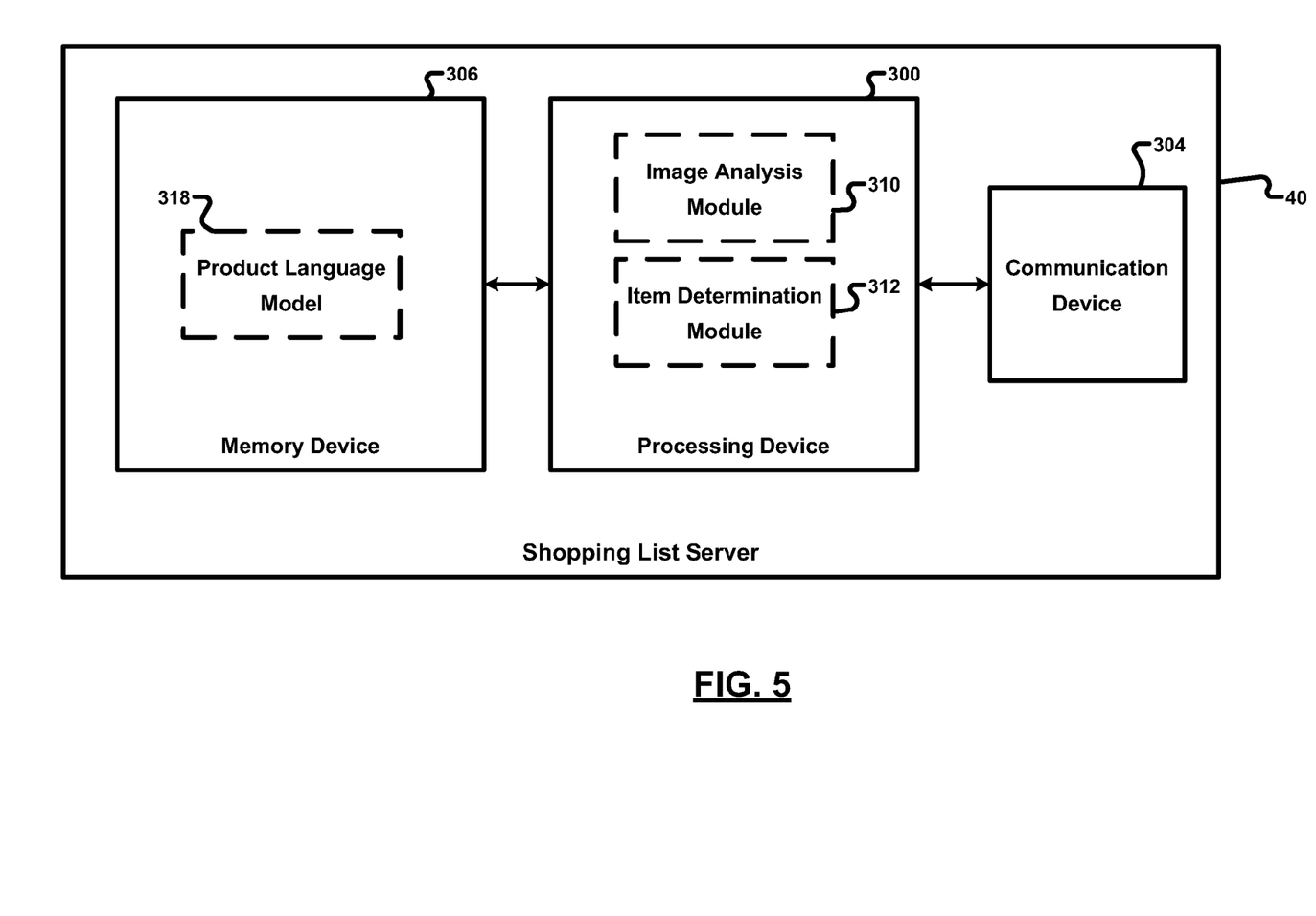
FIG. 5 is a schematic illustrating exemplary components of the shopping list server of FIG. 1B according to some embodiments of the present disclosure.

Referring now to FIG. 5, an example shopping list server 40 according to some embodiments of the disclosure is illustrated. In an exemplary embodiment, the shopping list server 40 includes a processing device 300, a communication device 304, and memory device 306.

The processing device 300 can include memory, e.g., read only memory (ROM) and random access memory (RAM), storing processor-executable instructions and one or more processors that execute the processor-executable instructions. In embodiments where the processing device 300 includes two or more processors, the processors can operate in a parallel or distributed manner. In the illustrative embodiment, the processing device 300 executes an image analysis module 310 and an item determination module 312.

The communication device 304 is a device that allows the shopping list server 40 to communicate with another device, e.g., the mobile computing device 10, via the network 30. The communication device 304 can include one or more wireless transceivers for performing wireless communication and/or one or more communication ports for performing wired communication.

The memory device 306 is a device that stores data generated or received by the shopping list server 40. The memory device 306 can include, but is not limited to a hard disc drive, an optical disc drive, and/or a flash memory drive. Further, the memory device 306 may be distributed and located at multiple locations. The memory device 306 is accessible to the processing device 300. In some embodiments, the memory device 306 stores a product language model 318. In some of these embodiments, the product language model 318 is a unigram language model that is trained using words that are used in retail. For example, if the retailer sells groceries, the product language model 318 may be trained with specific brand names of different products, different types of products, different unitary measurements, different amounts, known abbreviations, or any other suitable language. Additionally, the product language model 318 can be trained with purchase statistics indicating the frequency at which different products are purchased.

The product language model 318 receives an alphanumeric string as an input and outputs one or more candidate items corresponding to the inputted alphanumeric string. Furthermore for each candidate item, the product language model 318 can output a score corresponding to the candidate item. For example, if an input alphanumeric text is "carbon of eggs," the product language model may output the candidate items "carton of eggs" and "carbon of eggs." In this example, the candidate item "carton of eggs" may have a score of 0.99 and the candidate item "carbon of eggs" may have a score of 0.01, as the term "carton" is much more likely to have been input by a user than the term "carbon." In embodiments where the product language model 118 is trained with purchase statistics, the product language model may determine that the candidate item may include the term "eggs" or "EGGOS®." Because eggs are purchased much more frequently than EGGOS®, the candidate item having the term "eggs" would have a higher score than a candidate item having "EGGOS®," unless the inputted alphanumeric string contained the term "EGGOS" or a similar term. It is noted that the candidate items and the scores corresponding thereto are provided for example only and not intended to be limiting. Furthermore, while a unigram language model is discussed, the product language model 318 may be implemented as an n-gram language model or any other suitable language model.

As discussed, the processing device 300 may execute the image analysis module 310 and the item determination module 312. In some embodiments, the image analysis module 310 receives the digital photograph of the handwritten shopping list 20, determines one or more distinct handwritten text portions of the handwritten shopping list 20, and determines an alphanumeric string corresponding to each of the distinct handwritten text portions. As discussed previously, the distinct text handwritten text portions are items in the shopping list that have been handwritten. An alphanumeric string corresponding to a distinct handwritten text portion is an approximation of the distinct handwritten text portion. The image analysis module 310 can implement any suitable technique for determining the alphanumeric strings.

The item determination module 312 receives one or more alphanumeric strings from the image analysis module 310 and determines one or more candidate items for each of the alphanumeric strings. In some embodiments, the item determination module 312 utilizes the product language model 318 to determine the candidate items. It is noted, however, that any other suitable technique to determine the candidate items may be implemented at the item determination module 312.

Once the candidate items are determined, the item determination module 312 selects candidate items that are to be included in the electronic shopping list. In some embodiments, the item determination module 312 selects one of the one or more candidate items for inclusion in the electronic shopping list based on the scores of each candidate item. In these embodiments, the item determination module 312 can select the candidate item having the highest score for inclusion in the electronic shopping list. The selected candidate item can then be provided to the mobile computing device 10, such that the mobile computing device 10 receives the selected candidate items for each of the alphanumeric strings, which collectively define the items of the electronic shopping list. In other embodiments, the item determination module 312 provides the one or more candidate items (or a subset of the one or more candidate items selected based on their respective scores) to the mobile computing device 10. At the mobile computing device 10, the user selects one or more of the candidate items for inclusion in the electronic list (the collection of user selections comprise the items in the electronic shopping list). The user selection can be returned to the item determination module 312, such that the user selection can be used to further train, i.e., update, the product language model 318.

Once candidate items have been selected, the item determination module 312 has determined the items that make up the electronic shopping list. Once the electronic shopping list has been determined, the item determination module 312 can determine prices for each of the specific products in the electronic shopping list, or can determine ranges of prices of products for the generic products in the electronic shopping list. For example, a 6-pack of PEPSI® may be $1.99, and a carton of eggs may range from $0.99 to $2.99 depending on size, quality, etc. The prices and/or the ranges may be included in the electronic shopping list or may be associated with each corresponding selected item.

Furthermore, the item determination module 312 may be further configured to analyze the items in the electronic shopping list to identify the items indicating generic products, e.g., bread, milk, butter, and eggs. The item determination 312 can determine specific products that can be classified as the generic items, e.g., BLUE BONNET® Butter, WONDERBREAD®, etc. In one example, the item determination 312 can be based on past purchases or past list items. The item determination module 312 can provide items indicating the specific products to the mobile computing device 10 with the electronic shopping list, such that the user can select an item indicating the specific product instead of the item indicating the generic product.

The item determination module 312 can store the electronic shopping list, or the selected items, in the memory device 306 or can communicate the electronic shopping list, or the selected items to the mobile computing device 10.

Figure 6:
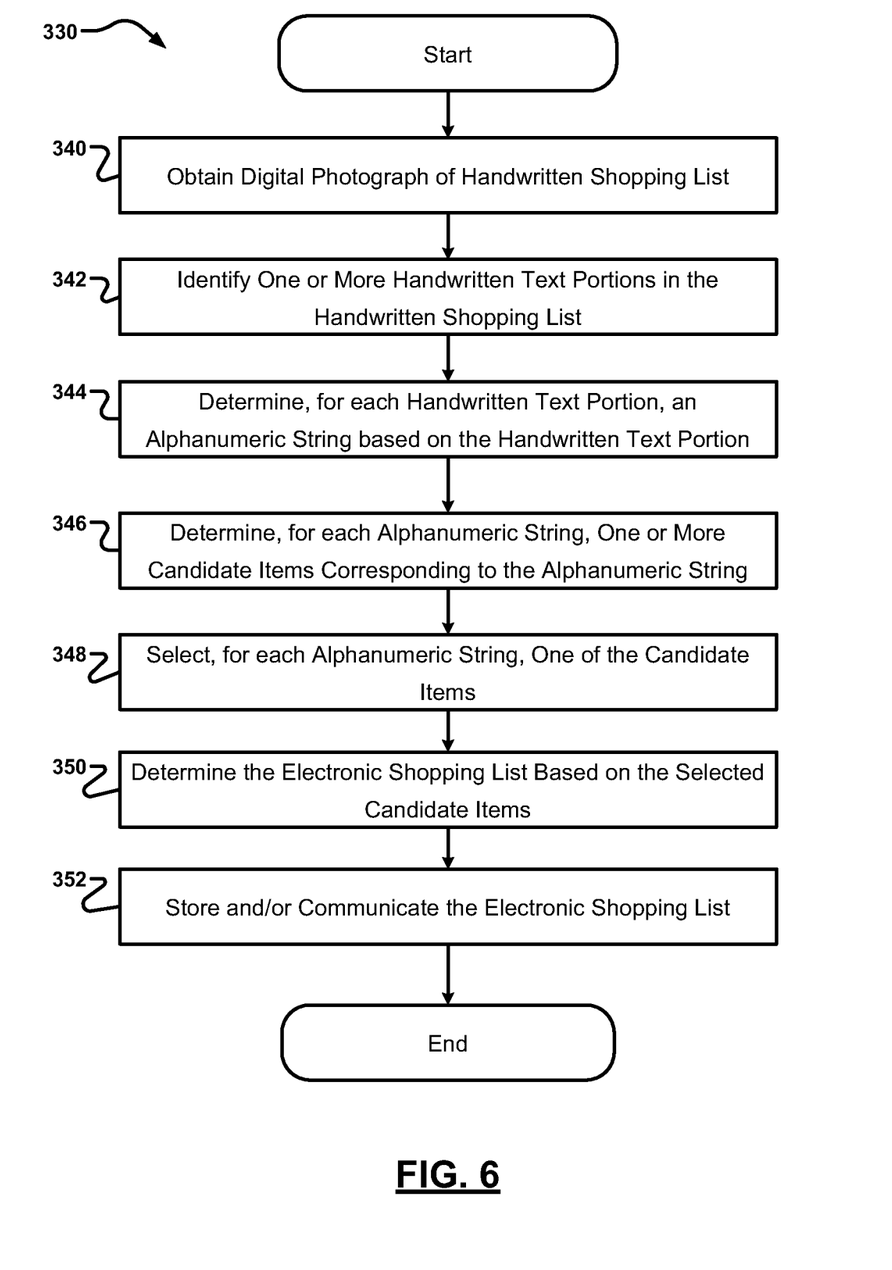
FIG. 6 is a flow chart illustrating an example method for generating an electronic shopping list according to some embodiments of the present disclosure.

Referring now to FIG. 6, an example method 330 for determining an electronic shopping list is illustrated. In the example embodiment, the method 330 is described as being performed at the shopping list server 40.

At operation 340, the image analysis module 310 obtains a digital photograph of a handwritten shopping list. As previously discussed, the digital photograph can be obtained from the mobile computing device 10. At operation 342, the image analysis module 310 identifies one or more distinct handwritten text portions in the handwritten shopping list. The image analysis module 310 can determine the distinct handwritten text portion in any suitable manner. For example, the image analysis module 310 can analyze the pixels in the digital photograph and differentiate the text portion from the background based on the colors of the pixels.

At operation 344, the image analysis module 310 determines, for each distinct handwritten text portion, an alphanumeric string based on the text portion. In some embodiments, the image analysis module 310 performs optical character recognition (OCR) on the handwritten text portion. The result of the OCR is the alphanumeric strings corresponding to each distinct handwritten text portion. The image analysis module 310 can determine the alphanumeric strings in any other suitable manner.

At operation 346, the item determination module 312 determines, for each alphanumeric string, one or more candidate items corresponding to the alphanumeric string. In some embodiments, the item determination module 312 provides an alphanumeric string to the product language model 318. Based on the alphanumeric numeric string, the product language model 318 returns one or more candidate items corresponding to the alphanumeric strings, and a score corresponding to each of the candidate items. Each candidate item can indicate a generic product, e.g., milk, eggs, bread, etc., or a specific product, e.g., 6-pack of PEPSI® or FROSTED FLAKES®. The score of an alphanumeric string is indicative of a degree of likelihood, or a probability, that the corresponding candidate item is the actual item represented by the alphanumeric string. Referring to the example provided above, if the alphanumeric string was "carbon of eggs" and the output of the product language model 318 may be P("carbon of eggs")=0.01, P("carton of eggs")=0.95; P("carbon of eggos")=0.01, and P("carton of eggos")=0.03.

At operation 348, the item determination module 312 selects, for each alphanumeric string, one of the candidate items corresponding to the alphanumeric string. The item determination module 312 can automatically select the candidate item having the highest score, or can provide the one or more candidate items (or a subset thereof) to the mobile computing device 10, thereby allowing the user to perform the selection.

At operation 350, the item determination module 312 can determine the electronic shopping list based on the selected candidate items. In particular, the selected candidate items can be aggregated into the items of the electronic shopping list. At operation 352, the electronic shopping list can be stored in the memory device 306 and/or communicated to the mobile computing device 10. It should be appreciated if stored in the memory device 306, the mobile computing device 10 can request the request the electronic shopping list at a later time.

The method 330 of FIG. 6 is provided for example only and not intended to be limiting. Variations of the 330 can be implemented without departing from the scope of the disclosure.

Figure 7:
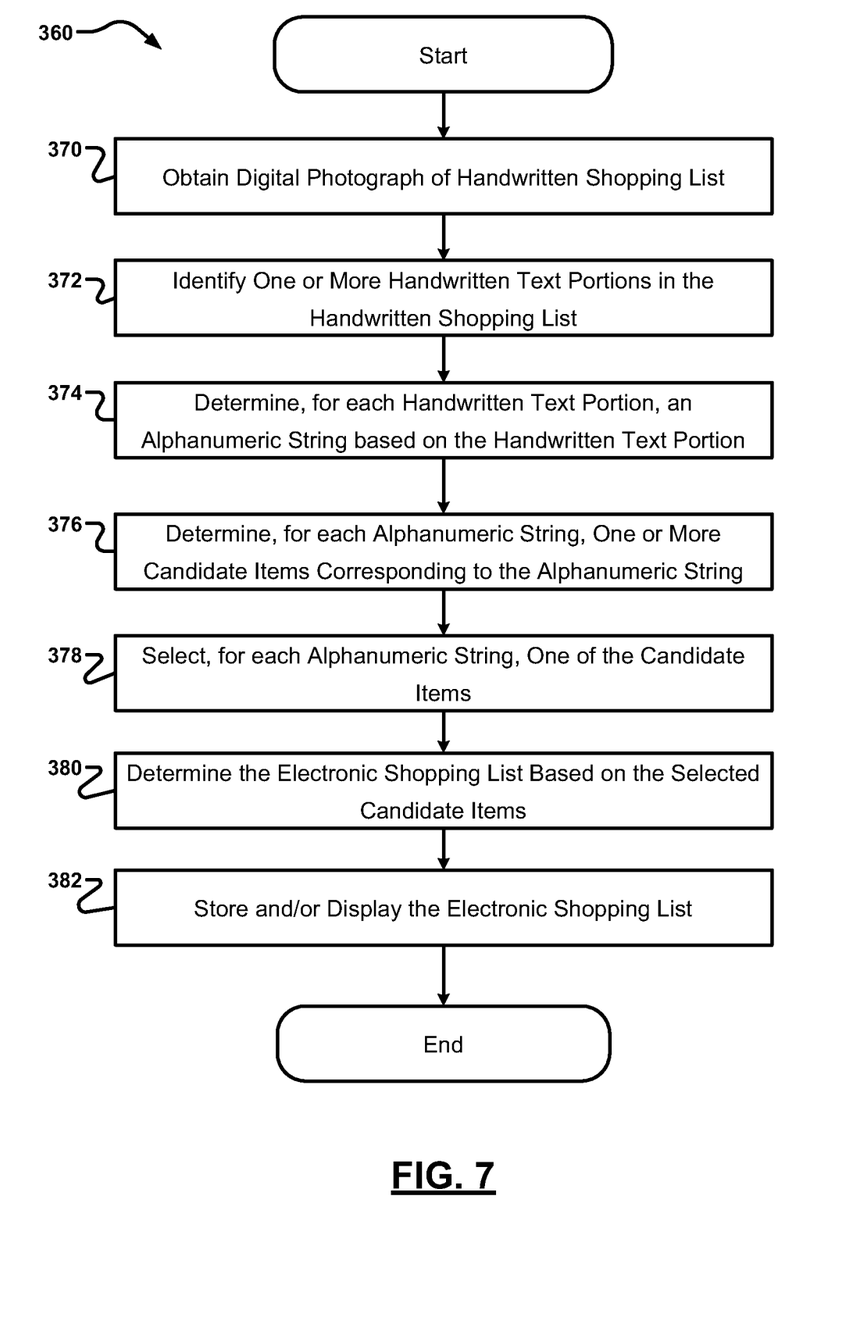
FIG. 7 is a flow chart illustrating an example method for generating an electronic shopping list according to some embodiments of the present disclosure.

Referring now to FIG. 7, another example method 360 for determining items to be included in an electronic shopping list is illustrated. In this example, the method 360 is performed at the mobile computing device 10, and in some embodiments, by the shopping list generation module 110.

At operation 370, the shopping list generation module 110 obtains a digital photograph of the handwritten shopping list. For example, the shopping list generation module 110 may allow a user to capture the digital photograph using the camera 108 or to upload the digital photograph from another source. At operation 372, the shopping list generation module 110 identifies one or more distinct handwritten text portions in the handwritten shopping list. The shopping list generation module 110 can determine the distinct handwritten text portion in any suitable manner. In some embodiments, the shopping list generation module 110 analyzes the pixels in the digital photograph and differentiates the text portion from the background based on the colors of the pixels.

At operation 374, the shopping list generation module 110 determines, for each distinct handwritten text portion, an alphanumeric string based on the text portion. In some embodiments, the shopping list generation module 110 performs optical character recognition (OCR) on the handwritten text portion. The result of the OCR is the alphanumeric strings corresponding to each distinct handwritten text portion. The shopping list generation module 110 can determine the alphanumeric strings in any other suitable manner.

At operation 376, the shopping list generation module 110 determines, for each alphanumeric string, one or more candidate items corresponding to the alphanumeric string. In some embodiments, the shopping list generation module 110 provides each alphanumeric string to a product language model 318. In some embodiments, the product language model 318 (discussed with respect to FIGS. 6 and 7) may be stored on the memory device 106 of the mobile computing device 10 or may be accessible to the shopping list generation module 110 over the network 30. The product language model 318 returns one or more candidate items corresponding to each alphanumeric string, and a score for each candidate item. As discussed, each candidate item can include a generic product or a specific product.

At operation 378, the shopping list generation module 110 selects, for each alphanumeric string, one of the candidate items. The shopping list generation module 110 can automatically select the candidate item having the highest score, or can display the one or more candidate items in the GUI, thereby allowing the user to perform the selection.

At operation 380, the shopping list generation module 110 can determine the electronic shopping list based on the selected candidate items. In particular, the selected candidate items can be aggregated into the items of the electronic shopping list. At operation 382, the electronic shopping list can be stored in the memory device 106 and/or displayed by the electronic shopping list in the GUI via the user interface 102. If stored in the memory device 106, the shopping list generation module 110 can display the electronic shopping list at a later time, i.e., when the user is shopping for the products indicated in the electronic shopping list.

The method 360 of FIG. 7 is provided for example only and not intended to be limiting. Variations of the method 360 can be implemented without departing from the scope of the disclosure.

Figure 8A:
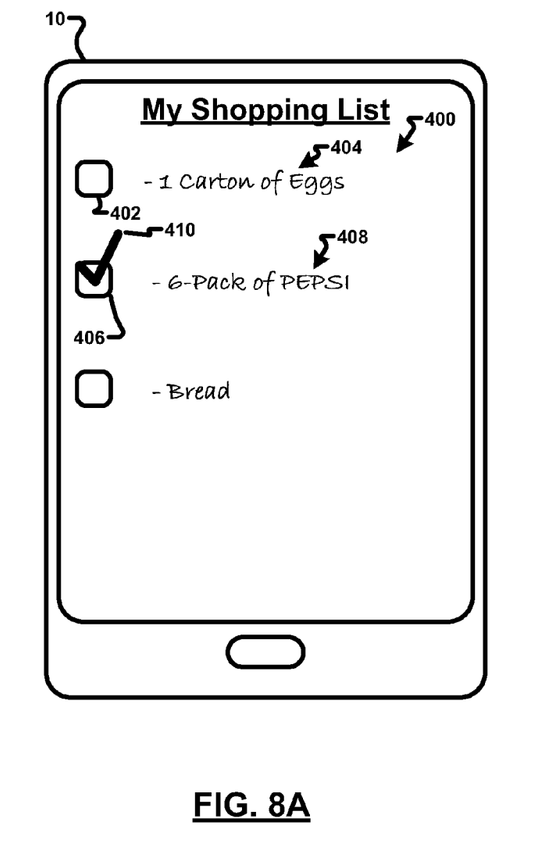
FIGS. 8A and 8B are drawings illustrating an example of a mobile computing device displaying an electronic shopping list according to some embodiments of the present disclosure.

Referring now to FIG. 8A, an example of an electronic shopping list 400 being displayed by a mobile computing device 10 according to some embodiments of the present disclosure. In the illustrated embodiment, the electronic shopping list 400 is based on the handwritten shopping list 20 of FIG. 2 and is comprised of an overlay overlaid onto the digital photograph of the handwritten shopping list 20. The overlay is a GUI that is generated based on the text portions, e.g., the first text portion 404 and the second text portion 408. The overlay includes input objects, e.g., a first input object 402 and a second input object 406, corresponding to each of the text portions. The input objects 402 or 406 allow the user to mark the digital photograph at specific locations, thereby indicating that the user has "checked" the item off the list. In the illustrated embodiment, the first input object 402 and the second input object 406 are checkboxes, i.e., a first checkbox displayed next to the first text portion 404 and a second checkbox displayed next to the second text portion 408. It should be appreciated that the checkboxes are only examples of input objects and not intended to be limiting. In the illustrated example, the user has marked the second input object 406 with check mark 410, thereby indicating that the 6-pack of PEPSI® has been placed in the shopping cart.

Figure 8B:
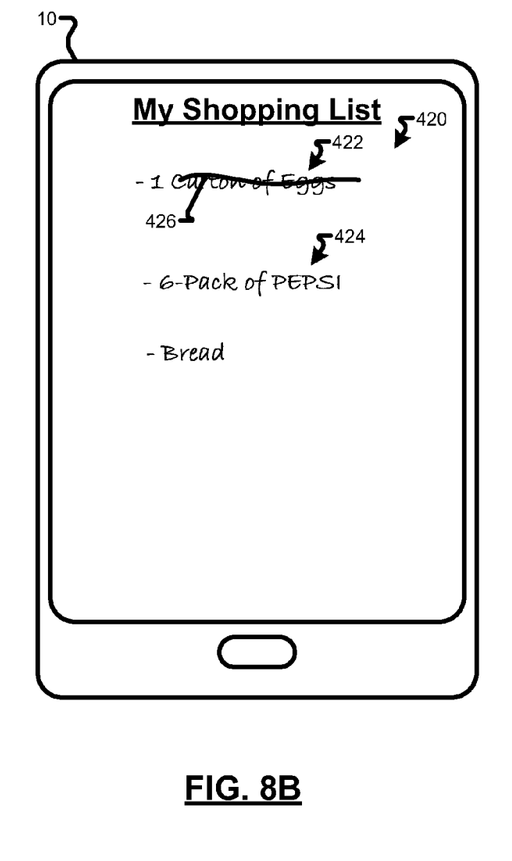

Furthermore, while the overlay of FIG. 8A includes visible input object, e.g., checkboxes, the overlay may be configured with non-visible input objects that display markings when the user interacts with the user interface 102 in a specific manner. FIG. 8B illustrates an example of an electronic shopping list 420 that includes an overlay having non-visible input objects. In these embodiments, the input objects may be defined around the boundaries of the distinct handwritten text portions, e.g., text portion 422 and text portion 424, such that when a user swipes a finger or other input means across a boundary corresponding to a distinct handwritten text portion, a marking appears in the overlay which indicates an item has been "checked" off the shopping list. In the illustrated example, a line 426 can be displayed in the overlay over the swiped text portion. In the illustrated example, the user has swiped across a boundary corresponding to the first text portion 422. As a result, the line 426 is drawn through the first text portion 426. The overlays of FIGS. 8A and 8B are provided for example only and not intended to be limiting. Other overlays are contemplated and are within the scope of the disclosure.

Figure 9:
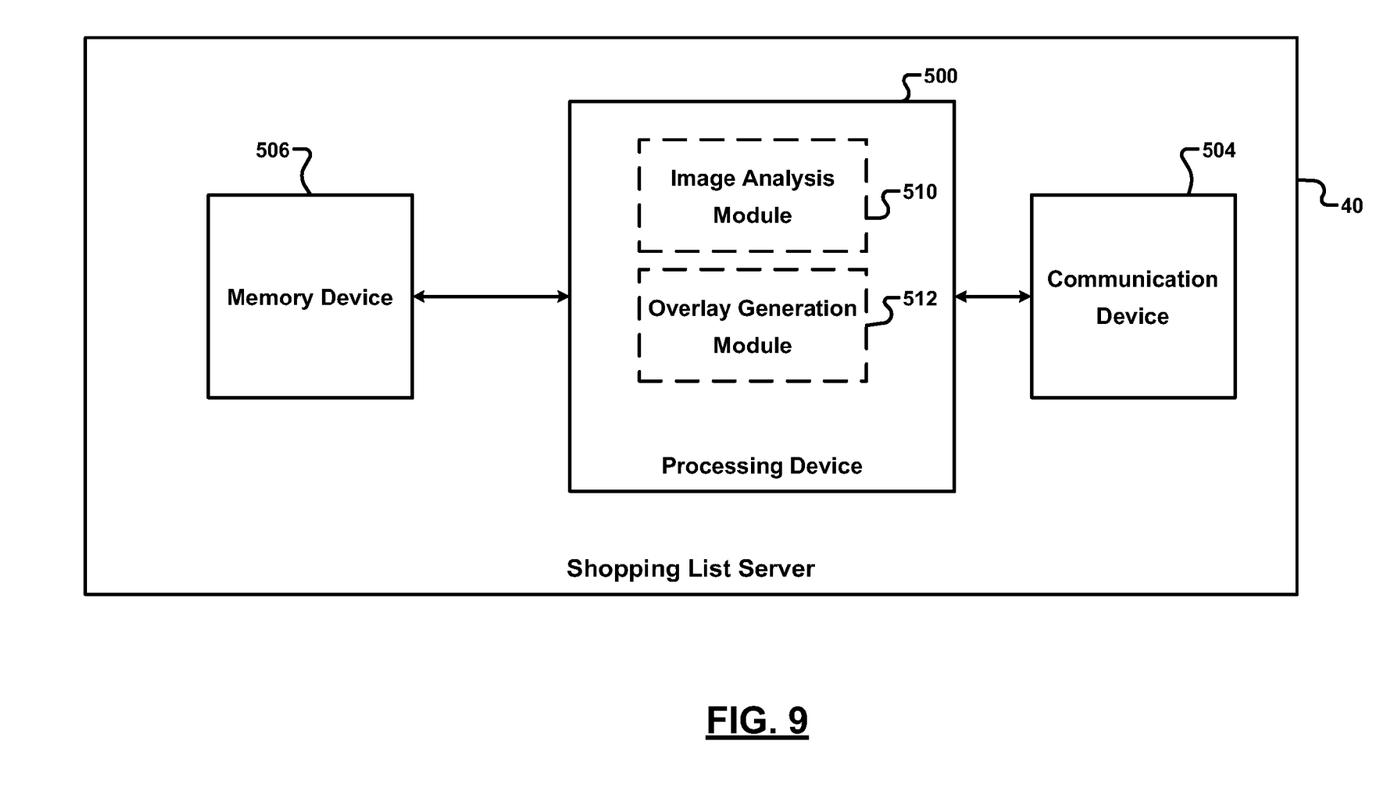
FIG. 9 is a schematic illustrating exemplary components of the shopping list server of FIG. 1B according to some embodiments of the present disclosure.

Referring now to FIG. 9, alternative embodiments of the shopping list server 40 is illustrated. In these embodiments, the shopping list server 40 is configured to generate an electronic shopping list that includes a digital photograph and an overlay. In the illustrated example, the shopping list server 40 includes a processing device 500, a communication device 504, and a memory device 506. The processing device 500 can execute an image analysis module 510 and an overlay generation module 512.

The image analysis module 510 receives a digital photograph of a handwritten and determines the distinct handwritten text portions in the digital photograph. For each distinct handwritten text portion, the image analysis module 510 determines a boundary of the distinct handwritten text portion. In some embodiments, the boundary is a bounding box having dimensions that sufficiently encapsulate the handwritten text portion.

The overlay generation module 512 generates the electronic shopping list by generating an overlay that is overlaid upon the digital photograph. As previously discussed, the overlay includes one or more input objects, each input object corresponding to a different handwritten text portion. The input objects allow a user of the mobile computing device 10 to mark the electronic shopping list at specific locations of the digital photograph. The overlay generation module 512 utilizes the locations of each boundary to determine input object locations where each of the input objects is to be located in relation to the digital photograph. After the input object locations are determined, the overlay generation module 512 can generate the electronic shopping list by aligning the input objects with the digital photograph at the determined input object locations, and storing the digital photograph and the overlay as a single file.

Figure 10:
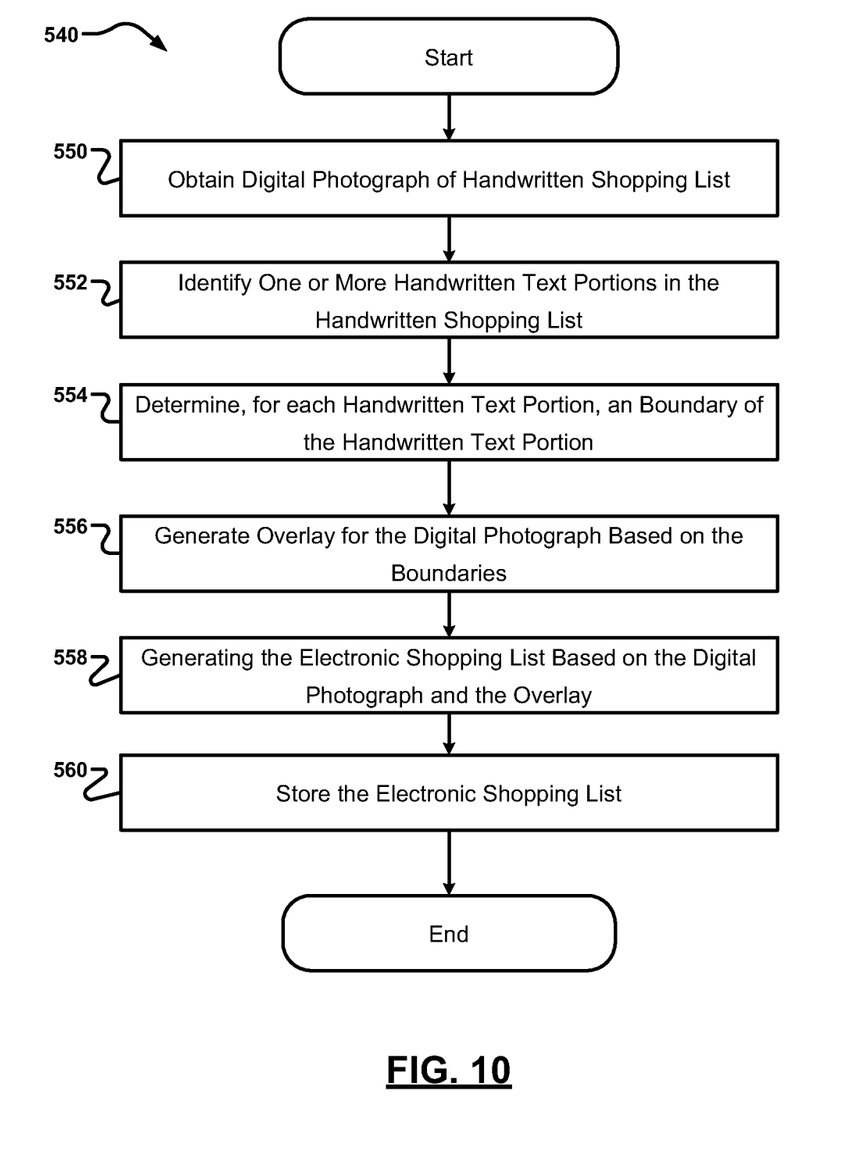
FIG. 10 is a flow chart illustrating an example method for generating an electronic shopping list according to some embodiments of the present disclosure.

Referring now to FIG. 10, a method 540 for generating an electronic shopping list is illustrated. The method 540 is described as being performed by the shopping list server 40. It should be understood that the method 540 may be modified such that it can be executed by shopping list generation module 110 of the mobile computing device 10 (FIG. 3).

At operation 550, the image analysis module 510 receives the digital photograph of the handwritten shopping list via the communication device 504. At operation 552, the image analysis module 510 identifies one or more distinct handwritten text portions in the digital photograph. The image analysis module 510 can determine the distinct handwritten text portion in any suitable manner. For example, the image analysis module 510 can analyze the pixels in the digital photograph and differentiate the text portion from the background based on the colors of the pixels.

At operation 554, the image analysis module 510 determines, for each identified handwritten text portion, a boundary for the handwritten text portion. In some embodiments, the image analysis module 510 determines a bounding box for each identified text portion. In some embodiments, the image analysis module 510 generates the bounding box such that the dimensions of the bounding box wholly or substantially encapsulate the text portion. For instance, for a particular text portion, the image analysis module 510 can identify the topmost point of the particular text portion, the lowest point of the particular text portion, the rightmost point of the particular text portion, and the leftmost point of the particular text portion. The image analysis module 510 can then generate a bounding box for the particular text portion based on the identified points.

At operation 556, the overlay generation module 512 generates an overlay corresponding to the digital photograph based on the boundaries. As previously discussed, the overlay is comprised of one or more input objects. For each boundary, the overlay generation module 512 determines a boundary starting location. The boundary starting location of a boundary is a reference point at which the overlay generation module 512 utilizes to determine the input object location, the input object location indicating where the input object is located with respect to the digital photograph. In some embodiments, the boundary starting location of a particular boundary is a particular pixel corresponding to the particular boundary. For instance, in embodiments where the boundary is a bounding box, the boundary starting location may be a pixel corresponding to the top left corner of the bounding box.

Based on the boundary starting location, the overlay generation module 512 determines the input object location corresponding to the boundary. As previously discussed, the input objects can be visible or non-visible input objects. In embodiments where the input objects are visible input objects, the input object location of an input object may be located outside the boundary to which the input object corresponds. For instance, in the example of FIG. 8A, the input object location may be a predetermined amount of pixels to the left of the boundary starting location. In embodiments where the input objects are non-visible, the input object location may be the boundary starting location. Once the overlay generation module 512 determines the input object locations corresponding to each boundary, the overlay generation module 512 generates the overlay by rendering each input location in the overlay at its corresponding input object location.

At operation 558, the overlay generation module 512 generates the electronic shopping list by overlaying the overlay on the digital photograph. The overlay generation module 512 can align the overlay and the digital photograph, such that each input object is located relative to its corresponding handwritten text portion. Once aligned, the overlay and the digital photograph may be stored in the memory device 506, as shown at operation 560.

The method 540 of FIG. 10 is provided for example and not intended to be limiting. It should be appreciated that the method 540 may include additional operations and some operations may be varied without departing from the scope of the disclosure. As previously stated, the method 540 can be modified such that it may be executed by the shopping list generation module 110 of the mobile computing device 10.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

What is claimed is:

1. A computer-implemented method for generating an electronic shopping list comprising:
   receiving, by a processing device, a digital photograph of a handwritten shopping list;
   identifying, by the processing device, one or more distinct handwritten text portions in the digital photograph;
   determining, by the processing device, one or more boundaries comprising a boundary for each distinct handwritten text portion of the one or more distinct handwritten text portions;
   generating, by the processing device, an overlay corresponding to the digital photograph, the overlay including one or more input objects, each input object corresponding to one of the one or more boundaries and providing an interface for a user to mark the digital photograph wherein the one ot more input objects do not intersect the one more distinct handwritten text portions;
   generating, by the processing device, the electronic shopping list to include the digital photograph and the overlay overlaid on the digital photograph;
   presenting, by the processing device, the electronic shopping list to a shopper responsible for obtaining one or more items listed thereon, and such that the one or more distinct handwritten text portions of the digital photograph are each visible and each input object of the one or more input objects is overlaid in relation to a corresponding distinct handwritten text portion of the one or more distinct handwritten text portions; and
   receiving, by the processing device, an input in at least one input object of the one or more input objects indicating that an item corresponding thereto has been obtained by the shopper.

2. The method of claim 1, wherein the presenting comprises displaying the electronic shopping list on a touch sensitive display.

3. The method of claim 2, wherein each input object of the one or more input objects is a checkbox.

4. The method of claim 2, wherein each input object of the one or more input objects is a non-visible input object coextensive with a corresponding boundary of the one or more boundaries.

5. The method of claim 1, wherein each boundary of the one or more boundaries substantially encapsulates a corresponding distinct handwritten text portion of the one or more distinct handwritten text portions.

6. The method of claim 5, wherein the determining comprises determining a boundary starting location for each boundary of the one or more boundaries.

7. The method of claim 6, wherein the boundary starting location is a first pixel in the digital photograph.

8. The method of claim 7, wherein the generating comprises inserting an input object of the one or more input objects proximate the first pixel.

9. A computer system comprising:
an image analysis module configured to:
receive a digital photograph of a handwritten shopping list;
identify one or more distinct handwritten text portions in the digital photograph; and
determine one or more boundaries comprising a boundary for each of the one or more distinct handwritten text portions;
an overlay generation module configured to:
generate an overlay corresponding to the digital photograph, the overlay including one or more input objects, each input object corresponding to one of the one or more boundaries and providing an interface for a user to mark the digital photograph; and
generate the electronic shopping list to include the digital photograph and the overlay overlaid on the digital photograph such that each input object is overlaid in relation to its corresponding distinct handwritten text portion; and
a mobile computing device programmed to:
present the electronic shopping list
to a shopper responsible for obtaining one or more items listed thereon, and
such that the one or more distinct handwritten text portions of the digital photograph are each visible and each input object of the one or more input objects is overlaid in relation to a corresponding distinct handwritten text portion of the one or more distinct handwritten text portions; and
receive an input in at least one input object of the one or more input objects indicating that an item corresponding thereto has been obtained by the shopper.

10. The computer system of claim 9 wherein the mobile computing device comprises a touch sensitive display and is further programmed to present the electronic shopping list on the touch sensitive display.

11. The computer system of claim 10, wherein each input object of the one or more input objects is a checkbox.

12. The computer system of claim 10, wherein each input object of the one or more input objects is a non-visible input object coextensive with a corresponding boundary of the one or more boundaries.

13. The computer system of claim 9, wherein each boundary of the one or more boundaries substantially encapsulates a corresponding distinct handwritten text portion of the one or more distinct handwritten text portions.

14. The computer system of claim 13, wherein the overlay generation module determines a boundary starting location for each boundary of the one or more boundaries.

15. The computer system of claim 14, wherein the boundary starting location is a first pixel in the digital photograph.

16. The computer system of claim 15, wherein the overlay generation module generates the electronic shopping list by inserting an input object of the one or more input objects proximate the first pixel.

* * * * *

UNITED STATES PATENT AND TRADEMARK OFFICE
CERTIFICATE OF CORRECTION

PATENT NO.        : 8,812,376 B2
APPLICATION NO.   : 13/631643
DATED             : August 19, 2014
INVENTOR(S)       : Valerie Goulart Page 1 of 1

It is certified that error appears in the above-identified patent and that said Letters Patent is hereby corrected as shown below:

In the Claims

Column 12, lines 31-62 should read

1. A computer-implemented method for generating an electronic shopping list comprising:
  receiving, by a processing device, a digital photograph of a handwritten shopping list;
  identifying, by the processing device, one or more distinct handwritten text portions in the digital photograph;
  determining, by the processing device, one or more boundaries comprising a boundary for each distinct handwritten text portion of the one or more distinct handwritten text portions;
  generating, by the processing device, an overlay corresponding to the digital photograph, the overlay including one or more input objects, each input object corresponding to one of the one or more boundaries and providing an interface for a user to mark the digital photograph wherein the one or more input objects do not intersect the one more or more distinct handwritten text portions;
  generating, by the processing device, the electronic shopping list to include the digital photograph and the overlay overlaid on the digital photograph;
  presenting, by the processing device, the electronic shopping list to a shopper responsible for obtaining one or more items listed thereon, and such that the one or more distinct handwritten text portions of the digital photograph are each visible and each input object of the one or more input objects is overlaid in relation to a corresponding distinct handwritten text portion of the one or more distinct handwritten text portions; and
  receiving, by the processing device, an input in at least one input object of the one or more input objects indicating that an item corresponding thereto has been obtained by the shopper.

Signed and Sealed this
Sixth Day of January, 2015

Michelle K. Lee
*Deputy Director of the United States Patent and Trademark Office*